United States Patent [19]
Luo et al.

[11] Patent Number: 5,726,415
[45] Date of Patent: Mar. 10, 1998

[54] GAS COOLED PLASMA TORCH

[75] Inventors: Lifeng Luo, Solon; Joel D. Kneisley, Painesville, both of Ohio

[73] Assignee: The Lincoln Electric Company, Cleveland, Ohio

[21] Appl. No.: 633,126

[22] Filed: Apr. 16, 1996

[51] Int. Cl.$^6$ ............................................. B23K 10/00
[52] U.S. Cl. ................... 219/121.48; 219/121.52; 219/121.51; 219/121.5; 219/75
[58] Field of Search ................ 219/119, 121.39, 219/121.48, 121.52, 118, 121.51, 74, 75; 313/231.31, 231.41

[56] References Cited

U.S. PATENT DOCUMENTS

| | | | |
|---|---|---|---|
| 3,366,772 | 1/1968 | Wickham et al. | 219/121 |
| 3,450,926 | 6/1969 | Kiernan | 313/231 |
| 3,562,486 | 2/1971 | Hatch | 219/121.55 |
| 4,024,373 | 5/1977 | Bykhovsky | 219/121 |
| 4,777,343 | 10/1988 | Goodwin | 219/121.5 |
| 5,013,885 | 5/1991 | Carkhuff et al. | 219/121.5 |
| 5,132,512 | 7/1992 | Sanders et al. | 219/121.5 |
| 5,235,155 | 8/1993 | Yamada | 219/121 |
| 5,296,668 | 3/1994 | Foreman et al. | 219/121 |
| 5,317,126 | 5/1994 | Couch, Jr. et al. | 219/121 |
| 5,514,848 | 5/1996 | Ross et al. | |

*Primary Examiner*—Mark H. Paschall
*Attorney, Agent, or Firm*—Vickers, Daniels & Young

[57] ABSTRACT

A plasma torch comprising an elongated electrically conductive nozzle with an internal, generally cylindrical chamber; an electrically conductive electrode with an elongated, cylindrical nose extending into the cylindrical chamber of the nozzle to define a relatively thin, elongated annular gas passage between the nozzle and the electrode nose, wherein the electrode includes a cylindrical portion above the nose, which portion has axially extending swirl grooves; and, a separate insulator sleeve engaging both the cylindrical portion and the nozzle for holding the electrode nose concentric with said cylindrical chamber of the nozzle. The nozzle includes means for venting a portion of said cooling gas from the relatively thin annular gas passage.

42 Claims, 7 Drawing Sheets

GAS COOLED PLASMA TORCH

The present invention relates to the art of plasma arc cutting and more particularly to a plasma arc cutting torch having improved cooling gas flow.

The invention is particularly applicable for use in plasma arc cutting torches of the type having a cylindrical electrode in a cylindrical elongated nozzle, whereby the electrode engages the nozzle to draw an arc for starting the plasma and it will be particularly described with relation to this type of contact started plasma torch; however, the invention has much broader applications and may be used with a plasma torch having a cylindrical electrode fixed with respect to the cylindrical passage of an elongated nozzle wherein the plasma starting is accomplished by high frequency or other known starting procedures.

INCORPORATION BY REFERENCE

Several patents exist which relate to the creation of a cooling gas flow rate by passing cooling gas through an annular passage between the electrode and nozzle. This concept is shown in Wickham U.S. Pat. No. 3,366,772 and Couch U.S. Pat. No. 5,317,126. It is well known that the volume of cooling gas to optimize cooling of the electrode in such a plasma arc torch is substantially greater than the optimum amount of work gas passing through the nozzle outlet and, thus forming the actual plasma column of the torch. To reduce the amount of cooling gas passing from the outlet or exhaust port of the nozzle where the plasma column is created, the above mentioned patents have ancillary bleed ports adjacent the exhaust port. The bleed ports allow the venting of a portion of the gas to increase the swirl strength and stability of the arc. Another arrangement for bleeding or venting a portion of the gas from a nozzle adjacent the exhaust port is Yamada U.S. Pat. No. 5,235,155. In all three of these patents, the plasma gas is controlled by venting some of the gas out bleed ports adjacent the outlet or exhaust port; however, actual cooling of the electrode is by circulated water. The concept of using a large volume of gas flowing around the electrode while a small portion of this gas is actually used for the plasma as shown by these patents, which patents are incorporated by reference herein as background information so the details of these patents need not be repeated in this specification. The need to stabilize the plasma arc by limiting the amount of gas flow, in a gas cooled torch, will decrease the gas volume used to cool the electrode. This problem is not solved by diverting gas flow by bleed ports at the exhaust port.

The use of bleed ports spaced from the exhaust port is suggested in Bykhovsky U.S. Pat. No. 4,024,373 wherein additional ports are provided for diverting cooling gas from the electrode area substantially before the cooling gas cools the electrode or reaches the exhaust port. In this prior patent, the additional ports are isolated from the exhaust port by the flow restriction device which hinders the free flow of cooling gas to the exhaust port. This concept has not been commercialized and is only representative of prior plasma torches wherein the gas in a gas cooled torch is diverted prior to cooling the electrode fully. To simplify the specification, this patent is also incorporated by reference herein.

The preferred embodiment of the present invention relates to an electrode having a swirl creating cylindrical portion on the electrode itself with a spaced cylindrical wall to stabilize the position of the electrode within the torch. The cylindrical portion has helical grooves and fins. A similar concept, although used on a different type electrode, is disclosed in Foreman U.S. Pat. No. 5,296,668. The use of a whirler-electrode is also shown in Kiernan U.S. Pat. No. 3,450,926. These patents are incorporated by reference herein to illustrate the use of a whirler on an electrode in a plasma torch, even though the electrodes are different from the electrode to which the present invention is directed.

BACKGROUND OF THE INVENTION

As disclosed in the patents incorporated by reference herein, it is known to optimize the volume of gas flowing out the outlet of an arc cutting torch by dirvreting a portion of the gas from the exhaust port by bleed ports adjacent the exhaust port. This type of structure does provide efficient and optimum cooling of the electrode in a gas cooled torch; however, it is destructive and disruptive of the formed plasma exiting from the nozzle. There has been a substantial need for a torch which can be commercially manufactured and which has full gas flow for cooling the electrode, with only a small amount of the gas passing through the exhaust port where the plasma column is created.

THE INVENTION

In accordance with the present invention, there is provided a gas cooled plasma torch comprising an elongated, electrically conductive nozzle having an internal, generally cylindrical chamber with an opened first end and a closed second end, wherein the second closed end has an exhaust port through which the work gas is introduced from the nozzle chamber onto the workpiece, as the plasma column. This novel torch also includes an electrically conductive electrode with an elongated, cylindrical nose extending into the cylindrical chamber of the nozzle to define a relatively thin, elongated gas passage between the nozzle and the electrode nose. The term relatively thin means a width less than about 0.025" for an annular gas chamber having a length of at least about 0.50". The electrode nose, which extends into the nozzle chamber, has a lower end generally spaced from the exhaust port during operation of the plasma torch to define a lower gas chamber below the electrode nose and above the closed end of the nozzle chamber. The present invention will be described with respect to a torch that is started by first moving the electrode against the nozzle and then withdrawing the electrode to create an arc. The invention is equally applicable to a movable electrode or an electrode which is fixed. In each instance, during operation of the plasma torch there is a lower gas chamber below the electrode nose and above the closed end of the nozzle chamber. The electrode itself includes a swirl shoulder or swirler above the nose with the swirl shoulder being a cylindrical portion of the electrode having an outer cylindrical wall with axially extending, helical swirl creating grooves. The cylindrical wall is a stabilizing surface which, in the preferred embodiment, coacts with a spaced cylindrical head on the electrode to allow concentricity control of the electrode with respect to the nozzle and to define a gas inlet chamber around the electrode. To effect this concentricity control between the electrode and nozzle, an insulator sleeve is provided which engages the outer cylindrical wall of the swirler and the nozzle itself so that this insulator sleeve holds the electrode nose concentric with the cylindrical chamber of the nozzle to define an annular cooling gas passage. The insulator sleeve has a lower portion engaging the nozzle and a central portion forming a cylindrical gas passageway with an inner cylindrical wall engaging the cylindrical wall of the swirler or cylindrical portion of the electrode to center the electrode. In accordance with the preferred embodiment, contact of the swirler and the sleeve allows movement of the electrode in the cylindrical chamber of the nozzle. An upper portion of the insulator sleeve has a set of gas inlets, which are oriented generally tangentially, but may be axial, and which define a somewhat standard swirl ring. The cooling gas enters the gas passage of the insulator sleeve through the gas inlets of the swirl ring and then passes into the thin annular passageway by way of the helical grooves in the swirler. The gas then enters the lower chamber below the electrode nose and exits from the exhaust port as a plasma column. By using the present invention, the insulator sleeve coacts with the swirl shoulder at a position above the thin passage between the electrode and nozzle so the insulator ring can stabilize the electrode, either for reciprocation with respect to the nozzle or fixed within the insulator sleeve.

An aspect of the invention is a combination of three separate structural elements forming the internal structure of a plasma torch, which combination allows cooling gas to pass through the swirler or cylindrical portion of the electrode and then into the thin annular gas passage. In this manner, the helical fins defined by the helical swirl grooves are efficient thermal devices for removing heat created in the electrode. Cooling gas swirls around these fins to remove heat from the electrode. The combined action of removing the heat by the swirler and then using the gas exiting from the grooves in the cylindrical portion for additional cooling of the electrode is an efficient arrangement for removing heat from the electrode.

In accordance with another aspect of the present invention, the nozzle defined above includes means for venting a portion of the cooling gas from the relatively thin annular gas passage formed around the nose of the electrode. In the preferred embodiment, the venting means is a series of circumferentially spaced venting ports, or bleed ports, spaced around the nozzle and located in the thin annular gas passage. Consequently, the efficient extraction of heat by the swirler formed on the electrode is followed by the extraction of the heated gas from the nozzle before it reaches the lower chamber containing the exhaust port, which forms the plasma column. Thus, there is no disruption of the swirling gas flow at the exhaust port. Consequently, there is little disruption of the actual creation of the plasma exiting from the exhaust port of the nozzle. In practice, the bleed ports exhaust at least 75% of the cooling gas, which gas has been previously heated by the helical fins formed integrally on the metal electrode. The portion of gas removed from the relatively thin annular passage is, in practice, approximately 90% of the total gas flow. Bleed ports are in the annular gas passage so that any disruption of gas flow and turbulence caused by venting of the gas is concentrated within the relatively thin passage, which passage prevents the disruption of gas flow and turbulence from affecting the lower outlet chamber below the nose of the electrode. The present invention relates to the concept of rapid heat extraction by incorporation of cooling fins formed on a cylindrical portion of the electrode, which cylindrical portion is also a guide structure. The venting of the cooling gas from the constricted area defined between the electrode and the nozzle occurs after a major amount of heat is removed from the electrode.

Although bleed ports are contemplated in the invention, it is possible to include an annular slot in the nozzle at a location within the thin annular gas passage for the purpose of bleeding a large portion of the cooling gas from the annular gas passage before the gas reaches the lower gas chamber below the electrode nose. The use of an annular slot will reduce the amount of turbulence created by the venting mechanism of the invention.

In accordance with another aspect of the present invention, the thin annular passage, which accommodates the venting arrangement of the cooling gas, has a given width and the bleed ports, or venting arrangement, are spaced into the gas passage a distance of at ten times the given width. In other words, the gas is vented from the annular passage, in this aspect of the invention, at a position generally greater than ten times the width of the annular passage. In accordance with another aspect of the present invention, the electrode also includes a cylindrical head which is concentric with the cylindrical portion or swirler, so the head and swirler act together to stabilize the radial position of the electrode, which position is concentric with the nozzle. In the invention, the cylindrical head is above the swirl ring or gas inlet openings of the insulator sleeve. The cooling gas enters through the openings or orifices below the head and above the swirler. Thereafter, the gas moves downwardly through the grooves on the swirler for heat dissipation by the helical fins between the grooves. The gas is then directed to the bleed ports in the thin annular passage for venting. Remaining gas is used to create the plasma column.

The primary object of the present invention is the provision of an improved plasma torch, which torch allows generally full flow of cooling gas along the electrode, but does not disrupt the plasma jet at the exhaust port.

In accordance with another aspect of the present invention, there is provided an electrode having an elongated cylindrical nose received in a cylindrical nozzle to define a relatively thin annular passage with bleed ports so that a large portion of the cooling gas is vented from the thin annular passage in a manner which does not disrupt the formation of the plasma column.

Another aspect of the present invention is the provision of a plasma torch as defined above, which plasma torch can be easily manufactured and assembled to accomplish efficient cooling and increased life of the electrode.

Yet another object of the present invention is the novel combination of an electrode, a nozzle and an alignment insulator sleeve that allows generally full flow of cooling gas to cool the electrode, but a small amount of such gas to form the plasma column.

These and other objects and advantages will become apparent from the following description taken together with the drawings of this application.

PREFERRED EMBODIMENT

Figure 1:
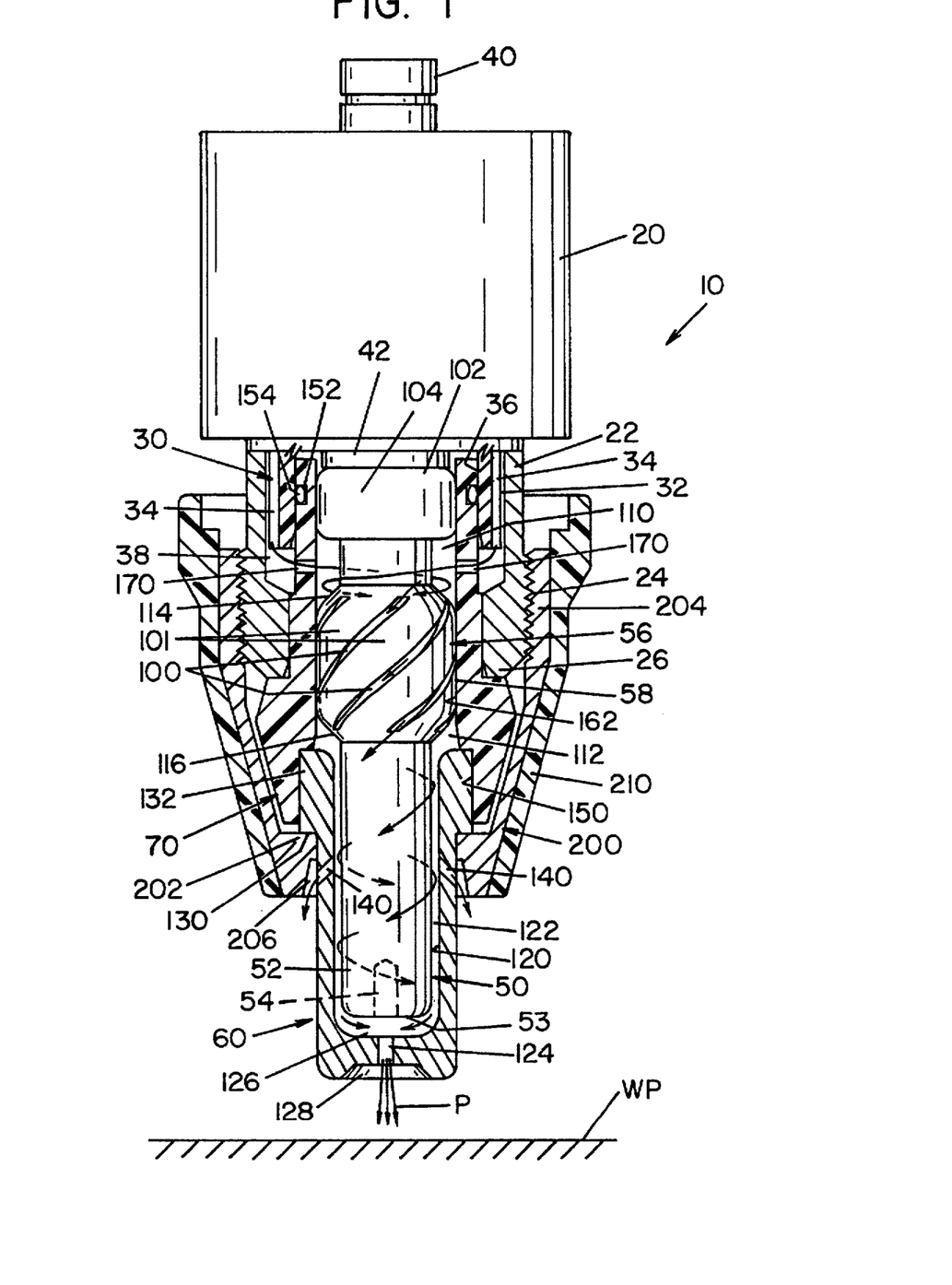
FIG. 1 is a partially cross sectioned side view of the preferred embodiment of the present invention.
Figure 2:
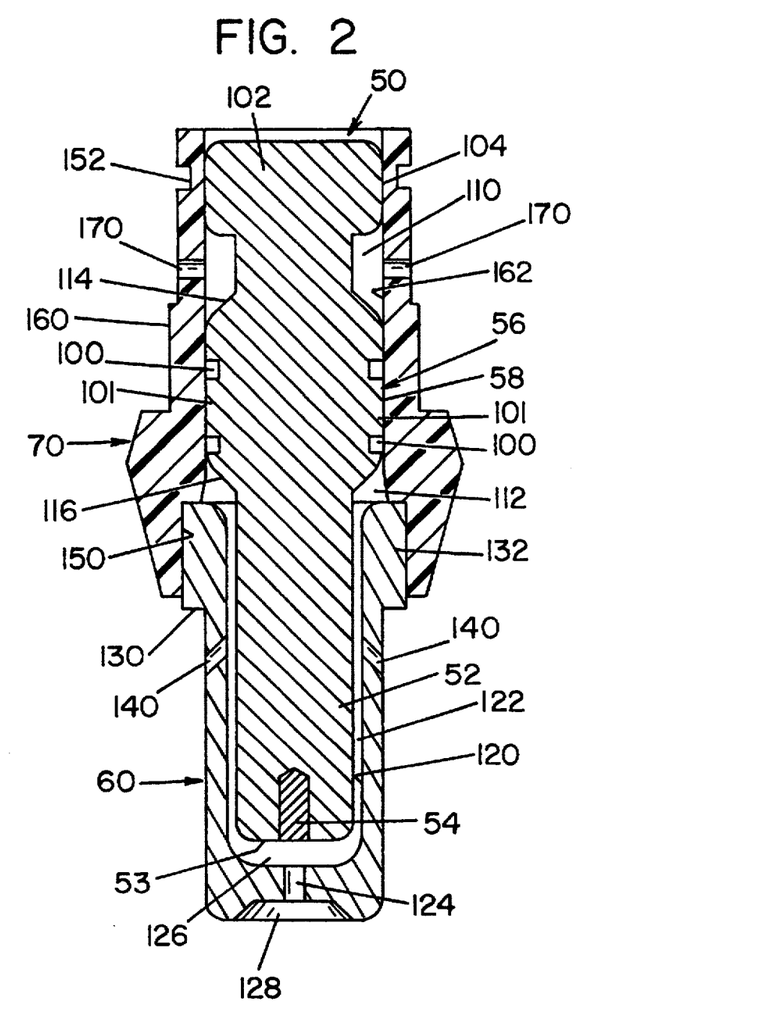
FIG. 2 is a cross sectional view of the three components utilized in practicing the preferred embodiment of the present invention shown in their assembled position.
Figure 3:
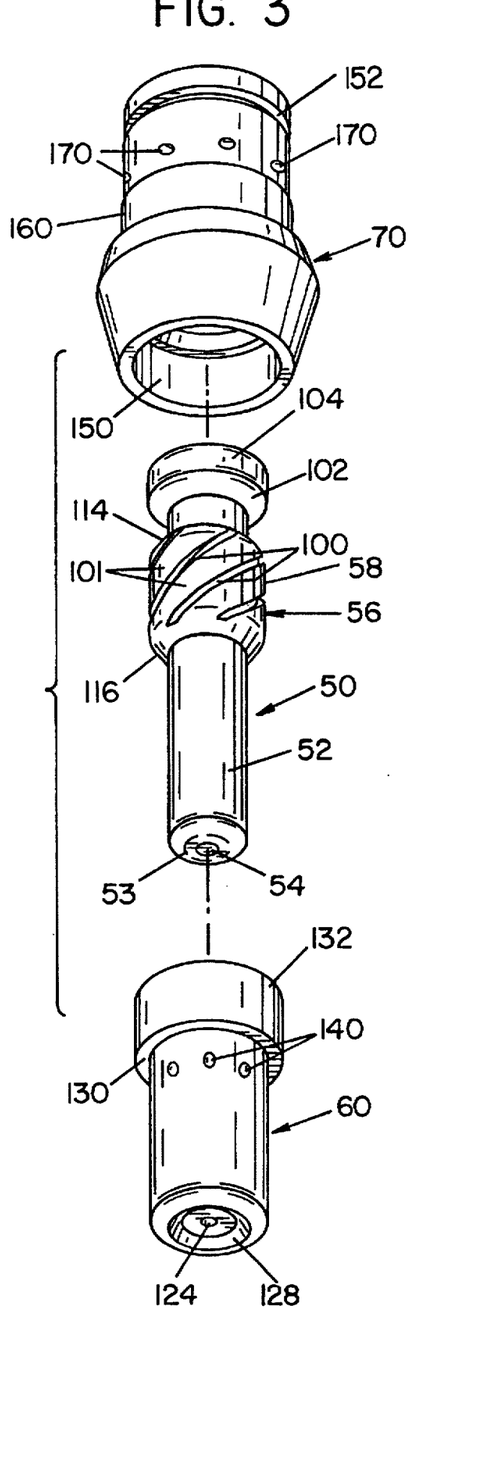
FIG. 3 is an exploded view of the three components illustrated in FIG. 2.

Referring now to the drawings, wherein the showings are for the purpose of illustrating the preferred embodiment only, and not for the purpose of limiting same, FIG. 1 shows a plasma torch 10 for creating a plasma gas column P for processing workpiece WP in accordance with standard plasma technology. Body 20 forms the support structure for torch 10 and includes a metal support extension 22 having external threads 24 and a downwardly facing shoulder 26 for holding components in the torch as illustrated. Body 20 includes a mechanism for starting the plasma and for delivering cooling gas through a downwardly extending, insulated gas manifold 30 with longitudinally extending, circumferentially spaced flutes 32 defining longitudinally extending, low resistant gas passages 34 in manifold 30. The manifold includes inner surface 36 for receiving the operating components of the torch so that cooling gas can be directed through a gas inlet 40 in body 20 to pass the cooling gas downwardly into the torch through gas passages 34 into a gas receiving chamber 38, as indicated by the arrows in FIG. 1. Gas flow into chamber 38 from inlet 40 is the full volume of cooling gas necessary for cooling the operative elements of torch 10. In accordance with the invention, three basic elements are provided and are shown in FIGS. 1, 2, and 3 as electrode 50, shown in more detail in FIG. 4, nozzle 60, shown in more detail in FIG. 5 and insulator alignment sleeve 70, shown in more detail in FIGS. 6 and 7. These three basic components including the electrode 50, nozzle 60 and insulator alignment sleeve 70 are constructed in accordance with the present invention to direct the cooling gas from chamber 38 through the three components to accomplish the advantageous gas management obtainable by use of the present invention.

Electrode 50 shown in FIGS. 1, 2, 3 and 4 is an elongated integral metal element, formed of copper or copper alloy. An elongated nose 52 terminates in a lower end 53 containing an insert 54, normally formed of hafnium. Above cylindrical nose 52 is a swirler or cylindrical portion 56 having an outer cylindrical wall 58 and containing a number of helical swirl grooves 100 defining fins 101 so that cooling gas can pass through the slots in a swirling motion from above swirler 56 to below cylindrical portion 56. In practice wall 58 engages the support structure of sleeve 70 so all gas moves through a slot. An upper cylindrical head 102 has an outer cylindrical wall 104 generally matching the outer wall 58 of swirler 56 stabilizes the shoulder in the insulator alignment sleeve 70, as illustrated in FIG. 1 and FIG. 2. The upper end of head 102 is engaged by a reciprocating actuator plunger 42. This actuator pushes electrode 50 downwardly for the purposes of starting. During plasma operation electrode 50 is in the upper position, shown in FIG. 1 and in FIG. 2, which "normal operating position" is used in practicing the invention and the invention will be defined with respect to that position of the electrode. It is recognized that the electrode may be a fixed structure, not reciprocating for the purposes of arc starting. Various other starting arrangements could be employed for the plasma torch in accordance with standard plasma technology.

Figure 4:
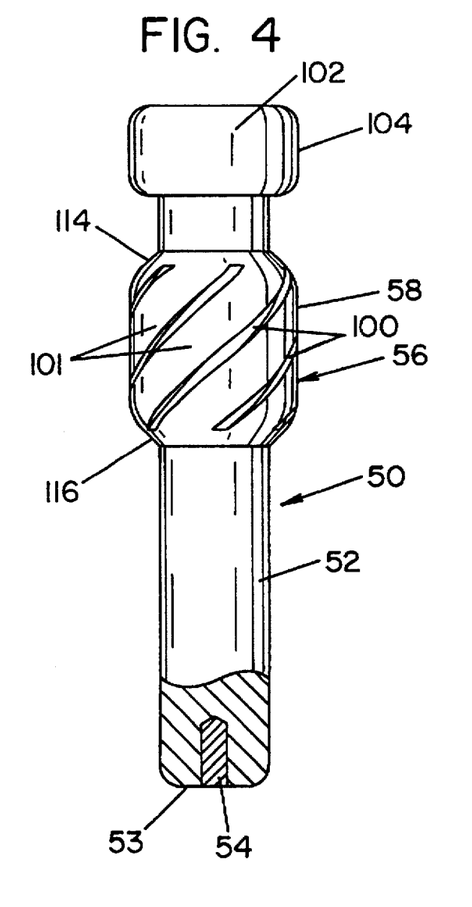
FIG. 4 is a side elevational view of the electrode used in the preferred embodiment of the present invention.

An annular gas chamber 110 is created between head 102 and swirler 56. Below swirler 56 is a further gas chamber 112 so that gas in chamber 110 swirls around swirler 56 and enters lower chamber 112. In this manner, a large amount of heat in electrode 50 is dissipated by fins 101 and conducted to the cooling gas. A full flow of gas through grooves 100 is in an amount to optimize cooling of the electrode. To decrease resistance of the rapidly moving cooling gas, swirler 56 has an upper tapered end 114 and a lower tapered end 116 defining the boundaries of chambers 110, 112, respectively. The cooling gas is preferably air.

Figure 5:
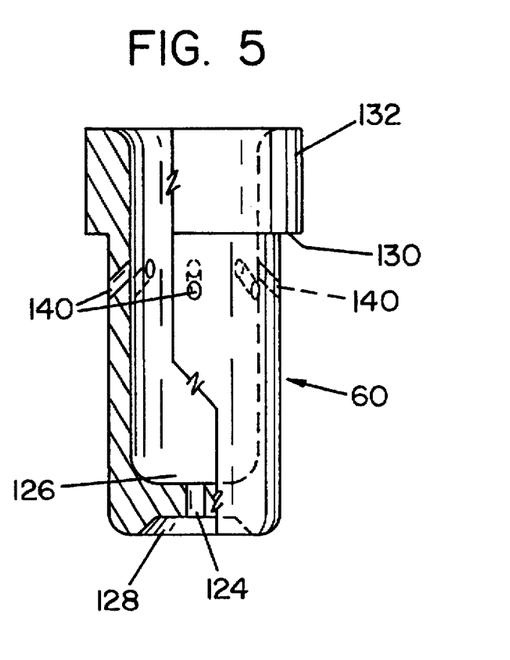
FIG. 5 is a side elevational view showing, in partial cross section, the nozzle used in the preferred embodiment of the present invention.

In accordance with the present invention, the elongated nose of electrode 50 extends into a fixedly positioned nozzle 60, best shown in FIG. 5, having an inner cylindrical chamber 120 defining a thin annular gas passage 122, which is communicated with chamber 112 to direct the swirling cooling gas from cylindrical portion 56 downwardly along the outer surface of nose 52. In accordance with standard practice, the lower end of nozzle 60 includes a cylindrical exhaust port 124 directing the work gas from a lower gas chamber 126 below lower end 53 of nose 52. Port 124 intersects a plasma protecting cup 128 so that the work gas in chamber 126 passes as a sustained cylindrical column through port 124. Various arrangements could be provided for mounting nozzle 60; however, in the illustrated embodiment a shoulder 130 below top 132 is used to capture the nozzle and force the nozzle into the insulator sleeve 70.

In accordance with the invention, nozzle 60 includes venting means for bleeding a major portion of the cooling gas from thin annular passage 122. In the preferred embodiment, and in accordance with an aspect of the invention, the venting means is in the form of circumferentially spaced bleed ports 140 angled downwardly from passage 122. In accordance with the invention, the bleed ports 140 vent 75–90% of the cooling gas through frusto conical bore 206 so that the remainder of the cooling gas is the work gas exiting from exhaust port 124. In practice, ports 140 bleed approximately 90% of the cooling gas and 10% of the cooling gas is the work gas exiting from port 124. Other arrangements could be used for venting the cooling gas from the passage 122 before the gas enters the lower gas chamber 126 for use in creating the plasma. In this manner, the plasma has uniform gas flow because the turbulence created by venting the cooling gas is concentrated in the thin annular passage 122 and damped as the gas flows downward. Consequently, heat extraction is primarily at grooves 100 of swirler 56 so that the cooling gas has a high temperature when it enters annular passage 122. A major portion of the cooling gas is vented at this thin annular passage so that the turbulence created by the exiting procedure is damped and concentrated in an area isolated from, and not exposed to, port 124.

Figure 6:
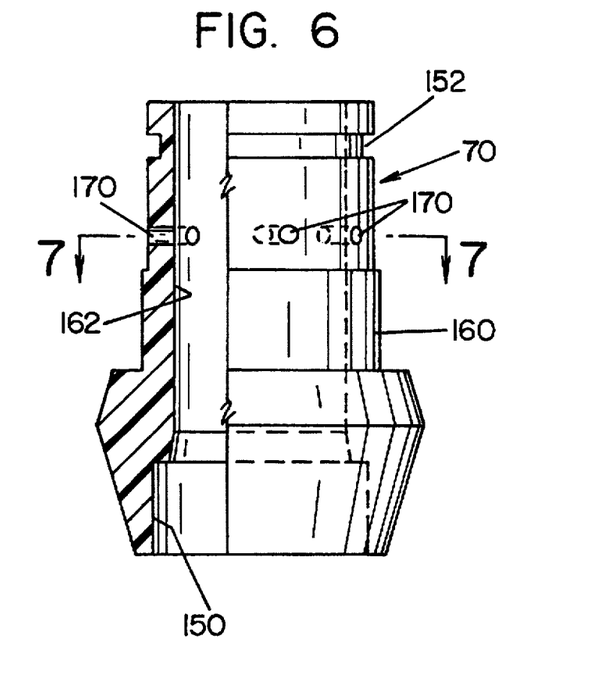
FIG. 6 is a side elevational view, somewhat in cross section, showing the insulator sleeve used in the preferred embodiment of the present invention.
Figure 7:
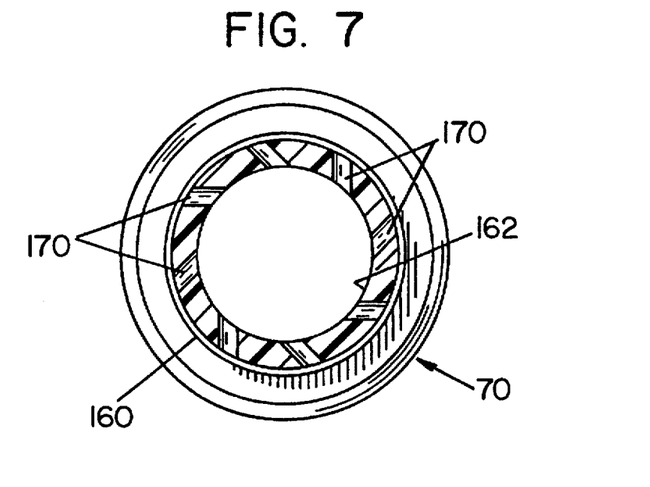
FIG. 7 is a cross sectional view taken generally along lines 7—7 of FIG. 6.

For the purposes of aligning the electrode nose concentrically in cylindrical chamber 120 of nozzle 60, the nose and nozzle are supported by insulator sleeve 70. A lower recess 150 accepts top 132 of nozzle 60. Sleeve 70 includes an upper groove 152 for an O-ring 154 that seals the insulator sleeve 70 with inner surface 36 of manifold 30 so that cooling gas does not flow backwardly between these components to affect operation of plunger 42. The central portion 160 of sleeve 70 has a cylindrical wall 162 matching the outer cylindrical walls 58 and 104 of shoulders 56, head 102, respectively. In this manner, electrode nose 52 is held concentric with chamber 120 of nozzle 60. The position of electrode 50 is stabilized concentrically by cylindrical portion or swirler 56 and head 102. An upper portion of sleeve 70 contains a standard swirl ring with tangential inlet ports 170. These ports could be radial gas orifices without imparting an initial swirling to the cooling gas. Cooling gas from gas receiving chamber 38 is swirled between heads 102 and cylindrical portion 56. The gas then moves past cylindrical portion 56 by way of a plurality of swirl grooves 100. At this position, a major portion of heat is extracted by fins 101 from the electrode. The hot gas continues to swirl around nose 52 and enters the confines of the thin annular passage 122, where it is vented at ports 140. A small percentage of cooling gas becomes the work gas in lower chamber 126 for the purposes of creating an optimized plasma column P.

To hold the three basic components in place, a standard metal shield 200 has a lower shoulder 202 that engages shoulder 130 of nozzle 60 to force the nozzle into recess 150 of sleeve 70. The threaded top portion 204 locks the members in position, as shown in FIG. 1, with electrode 50 and nozzle 60 concentric with metal extension 22. An appropriate heat shield 210 of insulating material covers shield 200 for the purposes of allowing manipulation of the torch during operation.

A full flow of cooling gas is used to dissipate heat from electrode 50. As the cooling gas is swirling through thin or narrow passage 122, a major portion of the gas is vented so that a low volume of work gas is used in actually forming plasma column P at exhaust port 124. This management of cooling gas can be used with either a fixed electrode or an electrode which is moved downwardly into engagement with the nozzle and then retracted by air pressure to create a starting arc. Either of these procedures is contemplated by the present invention since the electrode is in the position shown in FIG. 1 during normal operation of torch 10.

Figure 8:
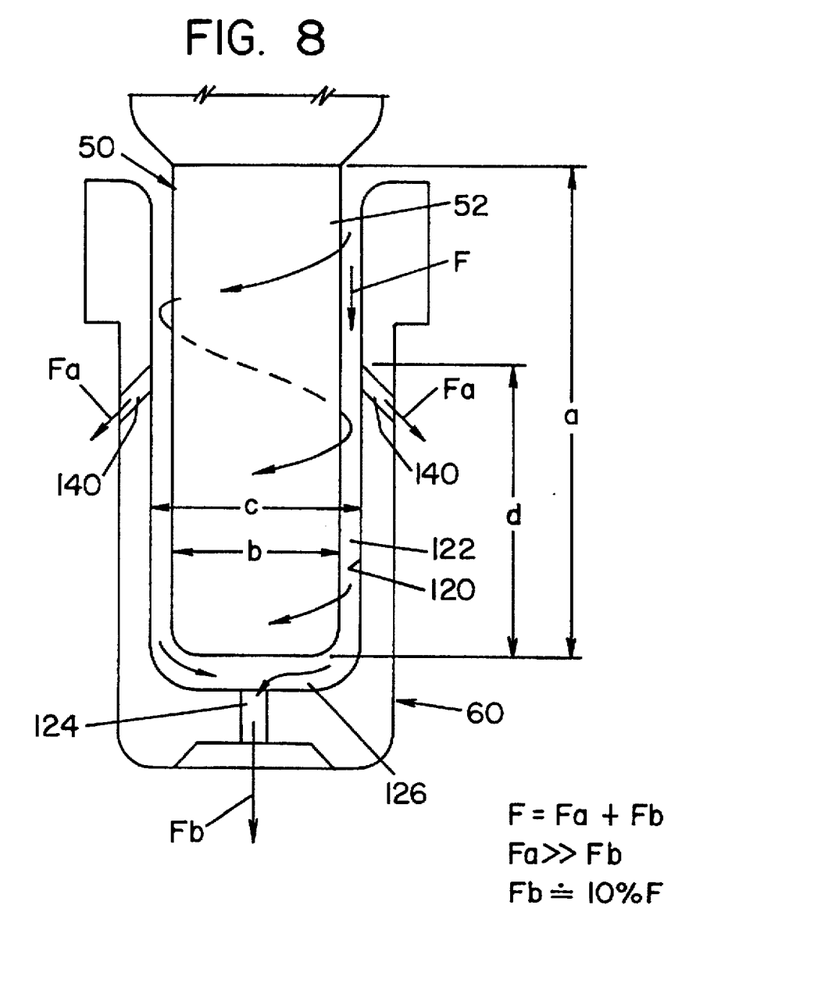
FIG. 8 is a simplified schematic view of the nozzle and electrode nose with dimensional characteristics defining the position of the bleed ports used in the preferred embodiment of the present invention, together with the dimensional aspects of the relationship between the electrode nose and the nozzle used in the preferred embodiment of the present invention.
Figure 9:
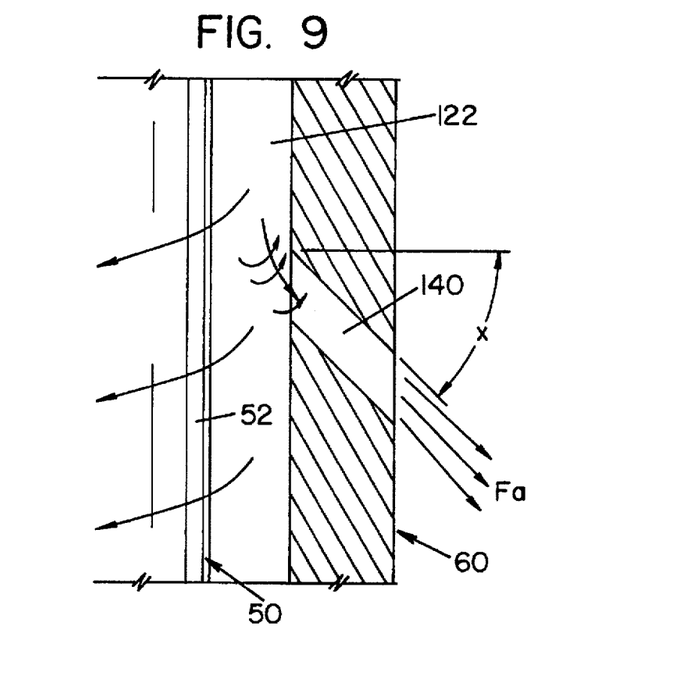
FIG. 9 is an enlarged partial cross sectional view showing the thin annular gas passage and the bleed ports used in the preferred embodiment of the present invention; and, FIG. 10 is a view similar to FIG. 9 showing a slot in the nozzle venting the cooling gas as used in an alternate embodiment of the present invention.
Figure 10:
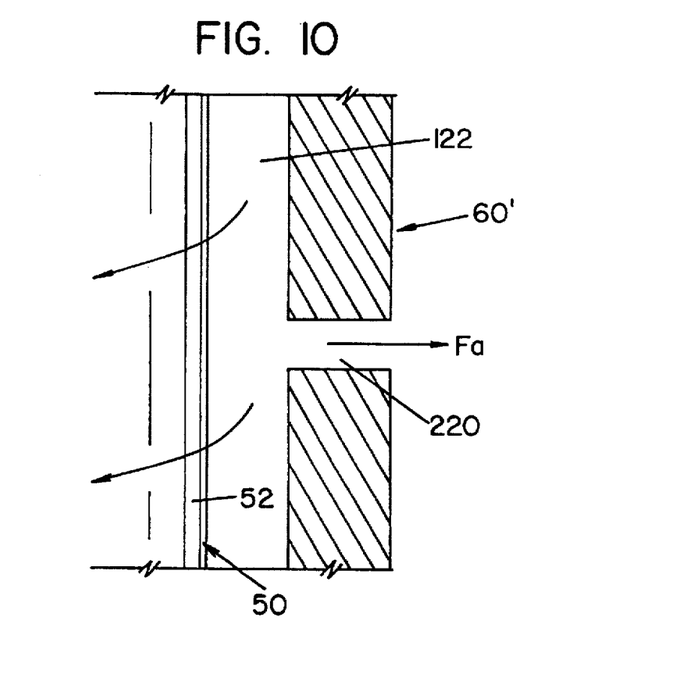

In FIG. 8, thin or narrow passage 122, nose 52 and nozzle 60 are illustrated to show dimensional relationships. The length of nose 52 is a, which is essentially the length of thin annular passage 122. Passage 122 has a thickness less than 0.025" and is determined by the relationship between dimension b and dimension c. In practice, the width or gap of this passage is approximately 0.015", the length a being approximately 0.750". The exit position of bleed ports 140 in passage 122 is represented by dimension d. Thus, dimension d is greater than zero. In practice, dimension d is at least 10 times the width of passage 122. The total cooling gas flow is F. The cooling gas exiting from ports 140 is Fa, which has a mass substantially greater than the mass of work gas Fb, exiting from port 124. In practice, Fb is approximately 10% of F. Fa is in the general range of 75–90% of F. These values are illustrated for the purposes of showing that the passage 122 is relatively thin causing concentrated flow along nose 52 with direct contact with the nose of the electrode for heat extraction. Ports 140 are located in this chamber for the purpose of allowing full gas flow around swirler 56 while maintaining stability of plasma P as it exits from exhaust port 124. As shown in FIG. 9, the turbulence caused by the exiting gas is concentrated in passage 122. Referring to FIG. 10, if the venting means from the nozzle 60 of the invention is a slot 220, then there is less turbulence in passage 122.

In either instance, the turbulence created by extraction of the gas from chamber 122 is isolated from the actual formation of the plasma column issuing from nozzles 60, 60'.

In practice, the angle x shown in FIG. 9 is 45° and eight ports 140 are equally spaced around nozzle 60 with each port having a diameter of 0.025". Exhaust port 124 has a diameter of 0.038". Length a is approximately 0.780" and the spacing d is approximately 0.430". In this manner, approximately 90% of the cooling gas is vented through ports 140.

Having thus described the invention, the following is claimed:

1. A gas cooled plasma torch comprising an elongated electrically conductive nozzle with an internal generally cylindrical chamber with an opened first end and a closed second end, said second end having an exhaust port through which work gas is introduced from the nozzle chamber onto the workpiece as a plasma column; an electrically conductive electrode with an elongated, cylindrical nose extending into said cylindrical chamber of said nozzle to define a relatively thin, elongated annular gas passage between said nozzle and said electrode nose, said electrode nose having a lower end spaced from said exhaust port during operation of said plasma torch to define a lower gas chamber below said electrode nose and above said closed second end of said nozzle chamber; said electrode including a cylindrical portion above said nose, said cylindrical portion having an outer wall with axially extending swirl grooves; said electrode including a head portion spaced above said cylindrical portion; and, an insulator sleeve means having a lower portion engaging said nozzle, a central portion with an inner cylindrical wall engaging said head portion and said cylindrical wall of said cylindrical portion on said electrode for centering said electrode within said nose in said cylindrical chamber of said nozzle and an upper portion with a set of gas inlets whereby cooling gas enters said gas passage of said insulator through said gas inlets and then passes into said thin annular gas passage by way of said swirl grooves of said cylindrical portion and then out said exhaust port as a plasma column, said nozzle includes means for venting a portion of said cooling gas prior to said cooling gas passing through said exhaust port.

2. A plasma torch as defined in claim 1, wherein said nozzle includes means for venting a portion of said cooling gas from said relatively thin annular gas passage.

3. A plasma torch as defined in claim 2, wherein said venting means is an annular slot in said nozzle and intersecting said relatively thin annular gas passage.

4. A plasma torch as defined in claim 2, wherein said venting means is a series of bleed ports spaced around said relatively thin annular gas passage.

5. A plasma torch as defined in claim 4, wherein said bleed ports are ports extending through said nozzle in a direction downward and radially outwardly.

6. A plasma torch as defined in claim 1, wherein said nozzle includes a series of bleed ports spaced around said relatively thin annular gas passages to vent a portion of said cooling gas from said annular gas passage.

7. A plasma torch as defined in claim 6, wherein said bleed ports are ports extending through said nozzle in a direction downward and radially outwardly.

8. A plasma torch as defined in claim 6, including gas turbulence damping means, said damping means including at least one of said bleed ports, said thin annular gas passage has a given width, said at least one of said bleed ports being spaced from said electrode nose a distance of at least about ten times said given width of said annular gas passage.

9. A plasma torch as defined in claim 4, including gas turbulence damping means, said damping means including at least one of said bleed ports, said thin annular gas passage has a given width, said at least one of said bleed ports being spaced from said electrode nose a distance of at least about ten times said given width of said annular gas passage.

10. A plasma torch as defined in claim 5, including gas turbulence damping means, said damping means including at least one of said bleed ports, said thin annular gas passage has a given width, said at least one of said bleed ports being spaced from said electrode nose a distance of at least about ten times said given width of said annular gas passage.

11. A plasma torch as defined in claim 7, including gas turbulence damping means, said damping means including at least one of said bleed ports, said thin annular gas passage has a given width, said at least one of said bleed ports being spaced from said electrode nose a distance of at least about ten times said given width of said annular gas passage.

12. A plasma torch as defined in claim 1, including means for bleeding not all, but at least about 75% of said cooling gas from a given position in said relatively thin gas passage.

13. A plasma torch as defined in claim 2, wherein said portion of said cooling gas is about 75-90%.

14. A plasma torch as defined in claim 3, wherein said portion of said cooling gas is about 75-90%.

15. A plasma torch as defined in claim 4, wherein said portion of said cooling gas is about 75-90%.

16. A plasma torch as defined in claim 5, wherein said portion of said cooling gas is about 75-90%.

17. A plasma torch as defined in claim 6, wherein said portion of said cooling gas is about 75-90%.

18. A plasma torch as defined in claim 8, wherein said portion of said cooling gas is about 75-90%.

19. A plasma torch as defined in claim 8, wherein said distance is about 30 times said given width.

20. A plasma torch as defined in claim 9, wherein said distance is about 30 times said given width.

21. A plasma torch as defined in claim 10, wherein said distance is about 30 times said given width.

22. A plasma torch as defined in claim 11, wherein said distance is about 30 times said given width.

23. A torch as defined in claim 1, wherein said outer cylindrical wall of said cylindrical portion has a given diameter and said head portion of said electrode includes a cylindrical head concentric with said wall of said cylindrical portion and having said given diameter and engaging said cylindrical wall of said central portion of said insulator sleeve above said gas inlets, whereby said cylindrical portion and said cylindrical head stabilizes said electrode in said insulator sleeve without interfering with flow of said cooling gas.

24. A plasma torch as defined in claim 23, wherein said nozzle includes a series of bleed ports spaced around said annular gas passages to vent a portion of said cooling gas from said annular gas passage.

25. A plasma torch as defined in claim 24, including gas turbulence damping means, said damping means including at least one of said bleed ports, said thin annular gas passage has a given width, said at least one of said bleed ports being spaced from said electrode nose a distance of at least about ten times said given width of said annular gas passage.

26. A plasma torch as defined in claim 23, including means for bleeding not all, but at least about 75% of said cooling gas from a given position in said gas passage.

27. A plasma torch as defined in claim 23, wherein said portion of said cooling gas is about 75-90%.

28. A plasma torch as defined in claim 1, wherein said relatively thin annular passage has a length of at least about 0.5 inches and a width of less than about 0.025 inches.

29. A plasma torch as defined in claim 23, wherein said relatively thin annular passage has a length of at least about 0.5 inches and a width of less than about 0.025 inches.

30. A plasma torch as defined in claim 1, wherein said head portion of said electrode is positioned above said gas inlets.

31. A plasma torch as defined in claim 30, wherein said head portion is spaced from said cylindrical portion to form a swirl ring for said gas flowing through said gas inlets.

32. A plasma torch as defined in claim 23, wherein said head portion is spaced from said cylindrical portion to form a swirl ring for said gas flowing through said gas inlets.

33. A plasma torch as defined in claim 1, wherein substantially all of said gas passes into said thin annular gas passage by way of said swirl grooves.

34. A plasma torch as defined in claim 23, wherein substantially all of said gas passes into said thin annular gas passage by way of said swirl grooves.

35. A plasma torch as defined in claim 1, wherein said cylindrical portion of said electrode includes an upper tapered end.

36. A plasma torch as defined in claim 35, wherein said cylindrical portion of said electrode includes a lower tapered end.

37. In a plasma torch comprising an elongated cylindrical electrode with an elongated nose, a nozzle with an elongated cylindrical passage for receiving said nose of said electrode to define a relatively thin, elongated annular gas passage for directing cooling gas to an exhaust port in said nozzle and below said electrode, the improvement comprising: a series of bleed ports in said nozzle and gas turbulence damping means, said bleed ports spaced around said annular passage to vent a portion of said cooling gas from said annular passage before said gas leaves said annular passage and flows toward said exhaust port for exit as a plasma column, said damping means including at least one of said bleed ports spaced an effective distance from said electrode nose for reducing gas turbulence closely adjacent said exhaust ports.

38. A plasma torch as defined in claim 37, wherein said bleed ports are ports extending through said nozzle in a direction downward and radially outwardly.

39. A plasma torch as defined in claim 37, said damping means including at least one of said bleed ports, said thin annular gas passage has a given width, said at least one of said bleed ports being spaced from said electrode nose a distance of at least about ten times said given width of said annular gas passage.

40. A plasma torch as defined in claim 39, wherein said distance is about 30 times said given width.

41. A plasma torch as defined in claim 37, wherein said portion of said cooling gas is about 75-90%.

42. A plasma torch as defined in claim 37, wherein said relatively thin annular passage has a length of at least about 0.5 inches and a width of less than about 0.025 inches.

* * * * *